US008726404B2

(12) United States Patent
Vipat et al.

(10) Patent No.: US 8,726,404 B2
(45) Date of Patent: May 13, 2014

(54) REGULATING ACCESS TO AND PROTECTING PORTIONS OF APPLICATIONS OF VIRTUAL MACHINES

(71) Applicant: Intel Corporation, Santa Clara, CA (US)

(72) Inventors: Harshawardhan Vipat, San Jose, CA (US); Ravi L. Sahita, Portland, OR (US); Roshni Chatterjee, Sunnyvale, CA (US); Madhukar Tallam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/653,077

(22) Filed: Oct. 16, 2012

(65) Prior Publication Data
US 2013/0125119 A1 May 16, 2013

(30) Foreign Application Priority Data

Nov. 14, 2011 (WO) ................ PCT/US2011/060621

(51) Int. Cl.
*G06F 7/04* (2006.01)
(52) U.S. Cl.
USPC .......................................................... 726/27

(58) Field of Classification Search
None
See application file for complete search history.

(56) References Cited

U.S. PATENT DOCUMENTS

| 2006/0161719 | A1 | 7/2006 | Bennett et al. |
| 2006/0206687 | A1 | 9/2006 | Vega |
| 2007/0079090 | A1* | 4/2007 | Rajagopal et al. ............ 711/163 |
| 2010/0161875 | A1 | 6/2010 | Chang et al. |
| 2010/0241785 | A1 | 9/2010 | Chen et al. |

OTHER PUBLICATIONS

International Search Report and Written Opinion mailed Aug. 17, 2012 from International Application No. PCT/US2011/060621.

\* cited by examiner

*Primary Examiner* — Brandon Hoffman
(74) *Attorney, Agent, or Firm* — Schwabe, Williamson & Wyatt, P.C.

(57) ABSTRACT

Embodiments of apparatus, computer-implemented methods, systems, and computer-readable media are described herein for a virtual machine manager, wherein the virtual machine manager is configured to selectively employ different views with different permissions to map guest physical memory of a virtual machine of the apparatus to host physical memory of the apparatus, to regulate access to and protect different portions of an application of the virtual machine that resides in different portions of the physical memory. Other embodiments may be described and/or claimed.

19 Claims, 6 Drawing Sheets

REGULATING ACCESS TO AND PROTECTING PORTIONS OF APPLICATIONS OF VIRTUAL MACHINES

RELATED APPLICATIONS

The present application claims priority under 35 U.S.C. §365(a) to International Application No. PCT/US2011/060621, filed Nov. 14, 2011, entitled "REGULATING ACCESS TO AND PROTECTING PORTIONS OF APPLICATIONS OF VIRTUAL MACHINES", which designates the United States of America. The entire contents and disclosure is hereby incorporated by reference in its entirety.

FIELD

Embodiments of the present invention relate generally to the technical field of data processing, and more particularly, to regulating access to and protecting different portions of an application of a virtual machine that reside in different portions of physical memory.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Hierarchal protection domains, in some cases referred to as "protection rings," may be implemented and enforced by hardware to protect data and functionality of a computer system. For example, in an Intel® Architecture execution environment, a kernel may execute with a high level of hardware privilege known as "Ring-0," device drivers may execute with intermediate levels of hardware privilege known as "Ring-1" and "Ring-2," and user-mode applications may execute with a lowest level of hardware privilege known as "Ring-3."

Computer code or instructions that cause undesirable and/or malicious operations or results may sometimes be referred to "as malware." Some malware may be configured to, when executed, use stealth to avoid detection by virus scanners and other security tools. Such malware may be referred to as a "rootkit." Some user-mode rootkits may exploit user-mode (e.g., Ring-3) processes or applications to hide themselves and steal sensitive user information such as passwords, online banking credentials, and data received from web pages. User-mode rootkits may function in a variety of ways. Some rootkits may inject code or instructions intended to execute undesirable and/or malicious operations into an executing application. Some rootkits may after a code path of an application to force execution of code or instructions that may cause undesirable and/or malicious operations.

Pages of virtual memory used by applications executing in virtual machines may be mapped to physical memory of a host in various ways. In some virtual machine environments, guest linear or virtual addresses ("GVA") may be mapped to host physical addresses with the aid of a guest page table ("GPT"). An operating system of a virtual machine, sometimes referred to as a "guest" operating system, may set up and maintain the GPT and may also set a page directory base register ("PDBR") to point to the base of the GPT. A processor of the host machine may use PDBR to find the GPT and may follow the GPT to locate a particular page. However, a GVA alone may not be sufficient to uniquely identify a page containing code or data. A GVA may be unique only in the context of a particular virtual machine application, and may need to be added to a CR3 to find a particular page of the application.

In Virtual Machine Extensions ("VMX") environments, an additional level of mapping in the form of extended page tables ("EPT") may be used by a virtual machine manager to specify its own additional permissions for memory pages. Extended page tables may be available as part of VT-x2 technologies, provided by Intel®. A GPT may map GVA to guest physical addresses ("GPA"), and the EPT may map GPA to host physical addresses. To complete a translation, a processor or processor core may first use CR3 to find the GPT. The processor may then follow the GPT to find the GPA. Then, the processor may utilize an EPTP field in a virtual machine control structure ("VMCS") to find an appropriate EPT, Last, the processor may use the EPT to locate the actual host physical address. The permissions contained in an EPT may be enforced by hardware in an operating system-independent manner. When a violation of these permissions occurs, control may be passed to the virtual machine manager, which may intervene and take further action.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
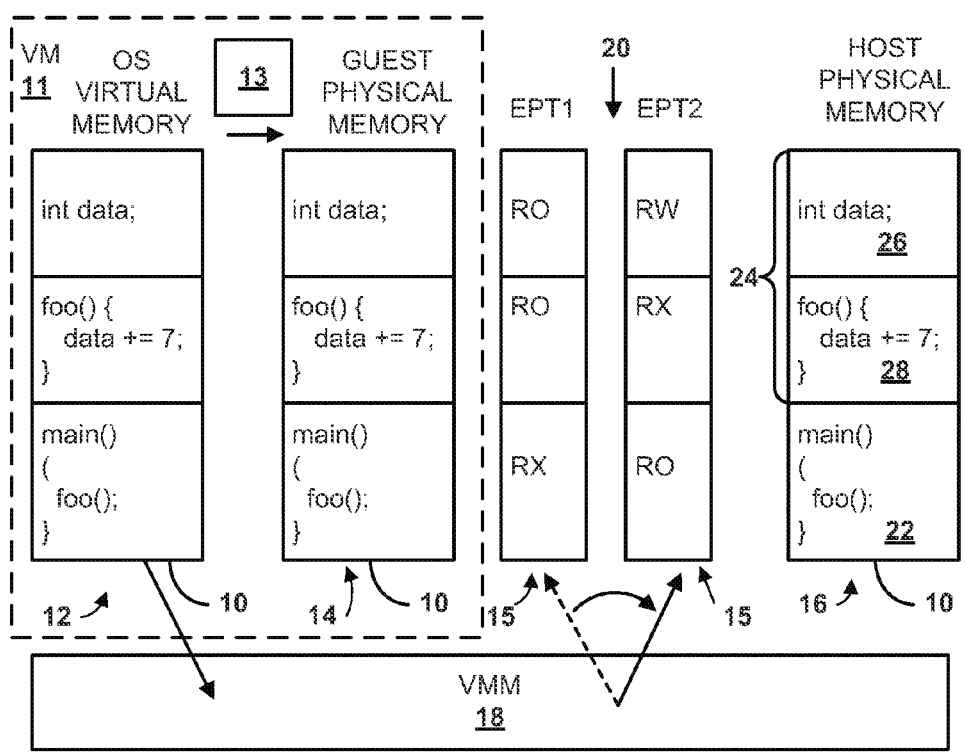
FIG. 1 schematically illustrates an example of how portions of a computer program of a virtual machine may be mapped from virtual memory to physical memory, in accordance with various embodiments.

In various embodiments, a computer-implemented method may include a plurality of instructions configured to provide an apparatus, in response to execution of the instructions by the apparatus, with a virtual machine manager, wherein the virtual machine manager is configured to selectively employ different views with different permissions to map guest physical memory of a virtual machine of the apparatus to host physical memory of the apparatus, to regulate access to and protect different portions of an application of the virtual machine that resides in different portions of the physical memory. In various embodiments, the different views may be implemented using extended page tables. In various embodiments, systems and methods may also be disclosed that perform these operations.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

As used herein, instructions or computer code may be "malicious" if they cause or have the ability to cause an apparatus and/or computer system to perform unintended, undesired and/or malicious operations. For example, known advertising malware, viruses, rootkits, spyware, Trojan horses and worms all may be considered malicious, and may be "blacklisted." On the other hand, code or instructions that are known not to cause unintended, undesirable or malicious operations may be referred to herein as "white listed."

FIG. 1 depicts schematically how, in accordance with various embodiments, an application 10 of a virtual machine 11 may be loaded into operating system virtual memory 12 and mapped from kernel virtual memory 12 to guest physical memory 14 using a guest page table ("GPT") 13. Guest physical memory 14 may in turn be mapped to host physical memory 16 using one or more extended page tables ("EPT") 15. This arrangement may be typical in VMX environments, but disclosed systems and methods may be implemented in other virtual machine environments without departing from the present disclosure.

In various embodiments, a hypervisor or virtual machine manager ("VMM") 18, which in VMX may operate in a special privilege mode, "VMX root," may regulate access to and protect different portions of application 10 of the virtual machine that resides in different portions of physical memory 16. In various embodiments, virtual machine manager 18 may be configured to selectively employ different views 20 (in FIG. 1, "EPT 1" and "EPT 2") to map guest physical memory 14 to host physical memory 16. In various embodiments, a "view" may be a permissions map for physical pages of a guest operating system. In various embodiments, one or more views may be implemented using extended page tables. For example, a view may be an instance of an extended page table.

In various embodiments, a first of the different views 20, such as EPT 1, may permit access to a portion of application 10 in a first portion 22 of host physical memory 16. For example, first portion 22 may include main( ). Accordingly, EPT 1, which permits read and execute access ("RX") to first portion 22, may be employed initially so that execution of main( ) of application 10 may be initiated.

EPT 1 also may limit or prohibit access to a portion of application 10 in a second portion 24 of host physical memory 16. For example, EPT 1 provides read only ("RO") access to second portion 24, which stores data and code portions 26 and 28, respectively, of application 10. Accordingly, while EPT 1 is in use, data portion 26 cannot be altered and code portion 28 cannot be executed. In some embodiments, a view may prohibit all access, including read access, to particular portions of physical memory.

In contrast, a second of the different views, EPT 2, may limit or prohibit access to first portion 22 of host physical memory 16 containing main( ) but permit access to second portion 24 of physical memory 16. For example, EPT 2 may provide read-write access ("RW") to data portion 26 and RX access to code portion 28 of application 10. Accordingly, while EPT 2 is in use, data portion 26 may be altered and code portion 28 may be executed.

In various embodiments, virtual machine manager 18 may be configured to determine, during operation, that a portion of application 10 in a portion (e.g., 22, 26, 28) of physical memory 16 to which access is limited under a current view is to be accessed, e.g., for writing or execution. For example, EPT 1 may be in use when execution of application 10 passes main( ) in first portion 222 to code portion 28 of application 10, which is not executable under EPT 1. An EPT violation may cause control to pass to virtual machine manager 18. Virtual machine manager 18 may selectively employ another view, such as EPT 2, that permits appropriate access to code portion 28. For example, virtual machine manager 18 may point the EPTP field in a virtual machine control structure ("VMS") to EPT 2, in order to make EPT 2 current.

In some embodiments, a view may be selectively employed based at least in part on whether instructions being executed (or to be executed) to access the portion of application 10 will cause malicious activity or operations to occur. Such instructions may be referred to herein as "malicious instructions." In some embodiments, virtual machine manager 18 may be configured to compare the instructions being executed or to be executed to instructions known to be malicious.

Upon determining that instructions being executed (or to be executed) will result or could result hi malicious activities or operations, virtual machine manager 18 may be configured to take various actions. For example, virtual machine manager 18 may store in a log an indication of whether a particular view was employed, or if access to a portion of an application was denied because code to be executed was determined to be malicious. In some embodiments, virtual machine manager 18 may notify an anti-malware agent (see FIG. 2) executing on virtual machine 11 when the instructions being executed or to be executed are determined to be malicious. The anti-malware agent may then take further action.

Figure 2:
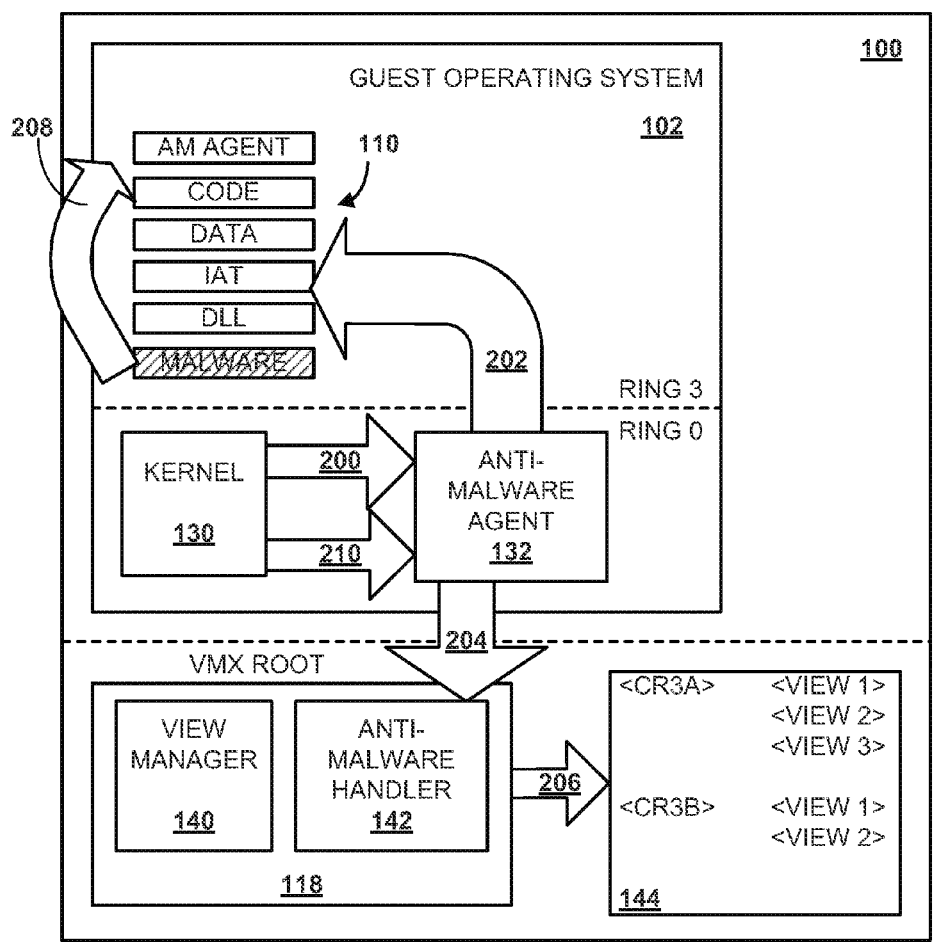
FIG. 2 schematically depicts an example of how various components may cooperate to protect memory and portions of applications from malicious code, in accordance with various embodiments.

Referring now to FIG. 2, a computer system 100 may include one or more virtual machines 102. Virtual machine 102 may include a guest operating system to facilitate execution of one or more applications 110. Application 110 may include various portions, including but not limited to data portions (e.g., stored in 26 in FIG. 1), code portions (e.g., stored in 22, 28 in FIG. 1), import address tables ("IAT"), libraries (e.g., dynamic link-libraries, or "DLLs"), and so forth. Portions of application 110 may be loaded into, fixed and/or locked into to pages of guest physical memory (e.g., 14 in FIG. 1) of virtual machine 102. In various embodiments, an application of a virtual machine such as application 110 may also include an application-level anti-malware agent ("AM Agent"). In some embodiments, the application level AM Agent may be delegated by another component (e.g., Anti-malware agent 132 described below) to carry out intra-application detection and remediation operations. In various embodiments, user-mode applications such as application 110 may execute with a relatively low privilege level that, compared to other privilege levels, provides fewer privileges, such as hardware privilege level Ring-3, for Intel® Architecture embodiments.

In addition to application 110, virtual machine 102 may include a kernel 130 and an anti-malware agent 132. Anti-malware agent 132 may exchange information with kernel 130 and other components as described below. Kernel 130 and anti-malware agent 132 may execute in accordance with a privilege level that provides more privileges than the privilege level of application 110, such as hardware privilege level Ring-0, for Intel® Architecture embodiments.

Computer system 100 may also include one or more virtual machine management-level applications executing outside virtual machine 102, e.g. with VMX root privileges. These management applications may include a view manager 140 and an anti-malware handler 142, either of which may be part of a virtual machine manager 118. In various embodiments, view manager 140 may maintain views and view associations, as well as switch between views based on the view associations when requested.

An example of how these components may operate in order to regulate access to portions of an application of a virtual machine will now be described. Anti-malware agent 132 may operate similarly to an operating system driver, and may register a callback with kernel 130 for loading/unloading of application 110. Accordingly, when application 110 is loaded by virtual machine 102 into pages of virtual memory, an "Application Load Notification" or other similar communication may be received by anti-malware agent 132 at arrow 200, e.g., via a callback from kernel 130. Anti-malware agent 132 may exercise admission control based on measurement and verification of application pages or based on some other policy.

Anti-malware agent 132 may then perform various tasks. In some embodiments, anti-malware agent 132 may fix or lock pages of application 110 in guest physical memory (e.g., 14 of FIG. 1) at arrow 202. Fixing or locking pages of application 110 in guest physical memory may ensure that the guest operating system does not swap out a portion (e.g., code or data) of application 110 in a protected portion of physical memory with something else.

Anti-malware agent 132 may create various views to map guest physical memory of virtual machine 102 to host physical memory (e.g., 16 in FIG. 1). The different views may be selectively employed, e.g., by virtual machine manager 118 and/or view manager 140, to regulate access to and protect different portions of application 110 of virtual machine 102 that reside in different portions of physical memory. In various embodiments, to ensure that portions of virtual machine applications such as application 110 are not accessible from other applications, views may be created on a per-application basis.

In various embodiments, at arrow 204, anti-malware agent 132 may provide to anti-malware handler 142 a plurality of associations between a page directory base register ("PDBR") and a plurality of views created by anti-malware agent 132. In various Intel® Architecture embodiments, PDBR may be control register CR3. At arrow 206, anti-malware handler 142 or view manager 140 may store these PDBR-to-view associations in a table 144. For example, in FIG. 2, three views are created for a first application which starts at CR3A, and two views are associated with a second application that starts at CR3B.

When an application such as application 110 is loaded, e.g., on an event such as PDBR load, anti-malware handler 142 may retrieve a view associated with application 110 (e.g., using the current PDBR) and make the view active. Thereafter, when attempts are made to access portions of physical memory (e.g., to write or execute) to which access is limited or prohibited, an EPT violation may occur. This may cause control to be passed from application 110 to anti-malware handler 142. Anti-malware handler 142 may be configured to selectively employ a different view of a plurality of different views associated with an application (see, e.g., 144) of the virtual machine to map guest physical memory of a virtual machine of the apparatus to host physical memory of the apparatus. This may regulate access to and protect different portions of the application that resides in different portions of the physical memory.

For example, at arrow 208, malware code may attempt to access (e.g., write to or execute) portions of physical memory to which access is limited or prohibited under a current view. In various embodiments, anti-malware handler 142 may determine that the code to be executed will cause or could cause malicious activity or operations, and may decline to switch to another view that would permit access to the requested pages. In some embodiments, anti-malware handler 142 may inform anti-malware agent 132 (or the intra-application anti-malware agent) of the violation. In various embodiments, anti-malware handler 142 may log the violation and/or a course of action taken by anti-malware handler 142 in response to the violation. In some embodiments, anti-malware handler may provide the log to anti-malware agent 132.

In some embodiments, anti-malware handler 142 may also monitor the GPT mapping (e.g., 13 in FIG. 1) between guest virtual memory (e.g., 12 in FIG. 1) and guest physical memory (e.g., 14 in FIG. 1) to avoid a so-called copy on write, or "COW," attack. An operating system may share DLL's in memory and may only copy pages when an application writes to a page. When writing to a page, a guest virtual address of a DLL page that is copied to a different location in host physical memory may not change. However, the guest physical address of the DLL page may change. Some malware therefore may include code that induces an operating system to write malicious code to the DLL page. This may be avoided by monitoring GPT mapping.

Referring back to FIG. 2, when application 110 is unloaded at arrow 210, e.g., in response to the application being closed, anti-malware agent 132 may receive notification and may perform memory clean up using a callback routine.

Figure 3:
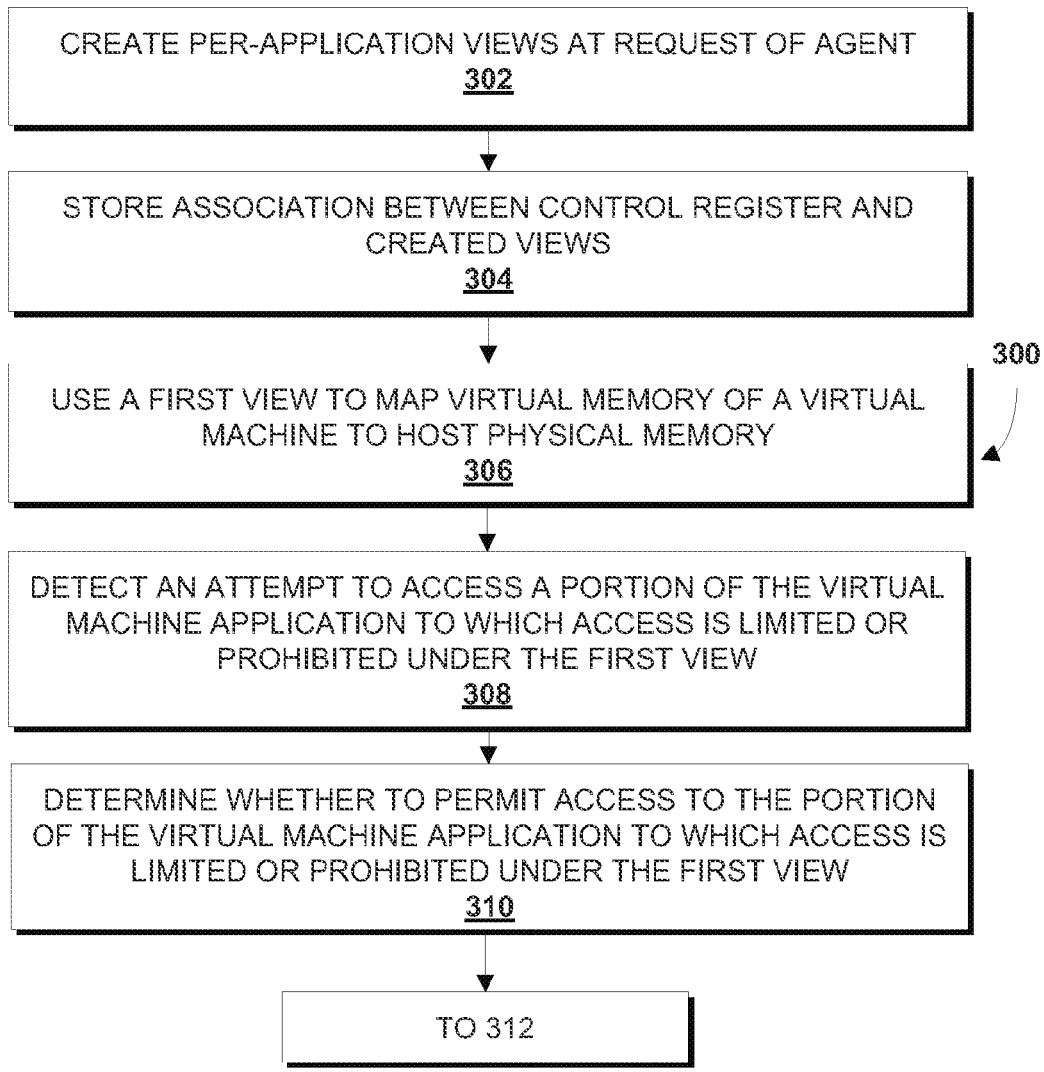
FIGS. 3-4 schematically depict an example method that may be implemented by a virtual machine manager, in accordance with various embodiments.
Figure 4:
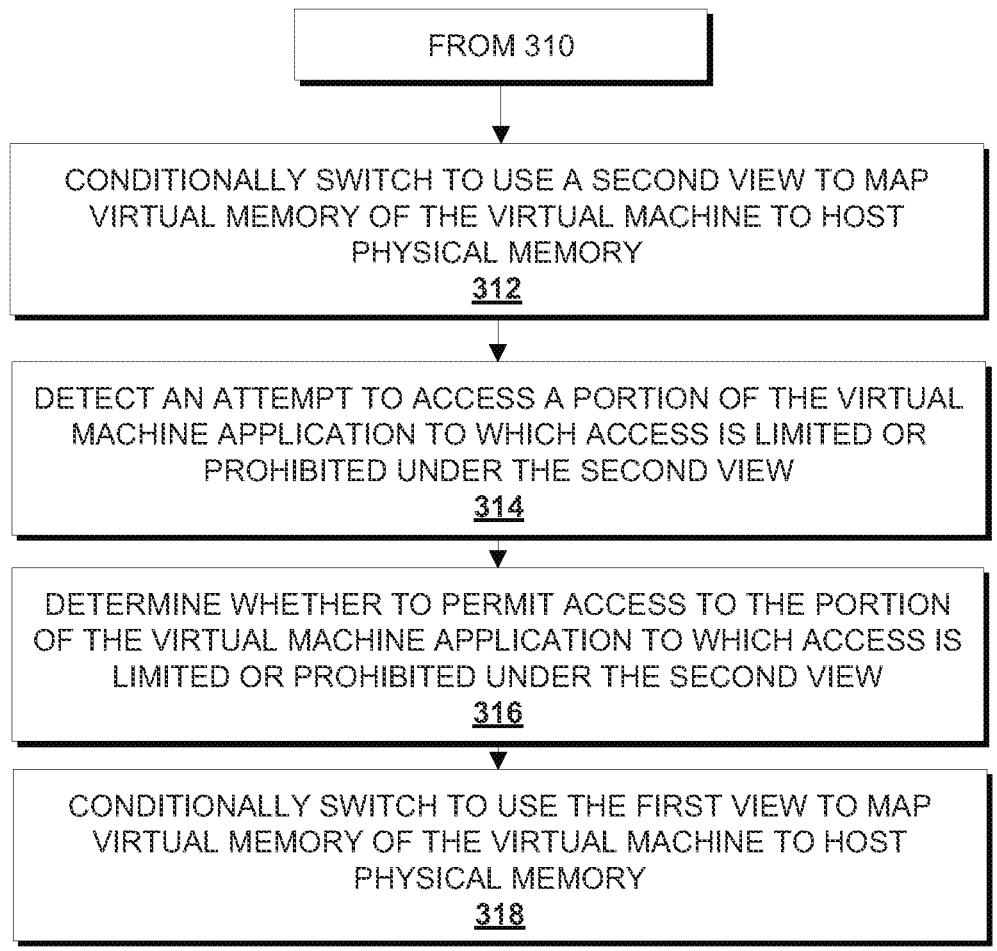

An example method 300 that may be implemented by a virtual machine manager such as virtual machine managers 18 or 118 is depicted in FIGS. 3-4. At block 302, the virtual machine manager may create views for each VM application that may be executed on a particular VM. At block 304, the virtual machine manager may store an association between a control register (e.g., CR3) and the views created at 302.

At block 306, the virtual machine manager may use a first view to map guest physical memory of a virtual machine to physical memory of a host. The first view may permit access to a first portion of an application in a first portion of the physical memory, but may limit or prohibit access to a second portion of the application in a second portion of the physical memory. At block 308, while the first view is in use, the virtual machine manager may detect an attempt to access the second portion of the virtual machine application to which access is limited or prohibited under the first view. In other words this attempt may violate access permissions for the second portion of the virtual machine application. In some embodiments, the virtual machine manager may at this point invoke the AM handler (e.g., 142) to determine whether to permit the access and/or perform remediation.

At block 310, the AM handler and/or virtual machine manager may determine whether to permit the access. For example, the AM handler may determine whether computer code being executed (or to be executed) to access the second portion of the virtual machine application is malicious. This may be done in various ways. For example, the AM handler may compare computer code being executed or to be executed to known malicious computer code, such as might be found in an online database or in a local database that is updated periodically.

At block 312, the virtual machine manager and/or view manager (e.g., 140) may, based at least in part on a result of the determination of block 310, conditionally switch to use a second view to map virtual memory of the virtual machine to physical memory. The second view may limit or prohibit access to the first portion of the application, but permit access to the second portion of the application. If the computer code being executed or to be executed is not malicious, the virtual machine manager and/or view manager may switch to the second view.

At block 314, while the second view is in use, the virtual machine manager may detect an attempt to access to the first portion of the virtual machine application, access to which is limited or prohibited under the second view. At block 316, the virtual machine manager and/or AM handler (e.g., 142) may determine whether to permit the access. In various embodiments, this may be done in similar ways as at block 310. At block 318, the virtual machine manager and/or AM handler may, based at least in part on a result of the determination at block 312, conditionally switch to use the first view to map virtual memory of the virtual machine to physical memory, similar to block 312.

Figure 5:
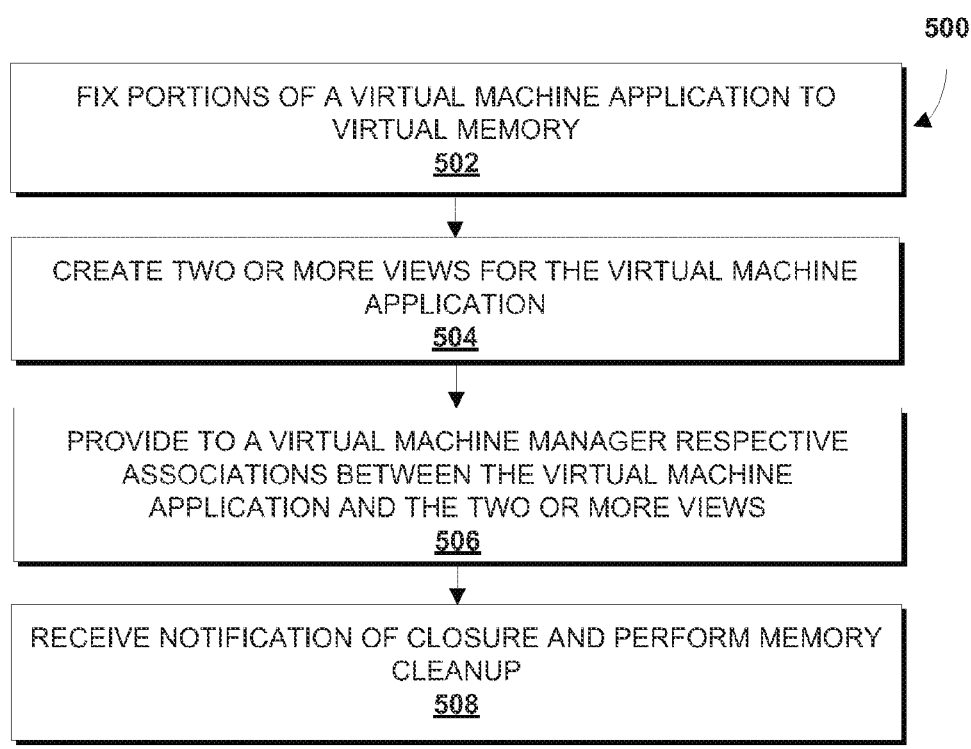
FIG. 5 schematically depicts an example method that may be implemented by an anti-malware agent, in accordance with various embodiments.

An example method 500 that may be implemented by an anti-malware agent such as 132 in FIG. 2 is shown in FIG. 5. At block 502, upon loading of an application in a virtual machine, the anti-malware agent may fix or lock portions of the application to guest physical memory (e.g., 14 in FIG. 1). At block 504, the anti-malware agent may create two or more views for the virtual machine application. While two views are described in the examples herein, this is not meant to be limiting, and any number of views may be created as appropriate.

In some embodiments, the anti-malware agent may create two views: a trusted view and an untrusted view. In the untrusted view, permissions for all pages may be set to both write and execute (e.g., RWX), which means there would be no access control when a guest operating system uses this view. In the trusted view, all the pages may be set to RO. At block 506, the anti-malware agent may provide, to a virtual machine manager such as 18 or 118, respective associations between the virtual machine application and the first and second views (see, e.g., 144 in FIG. 2).

Thereafter, the guest operating system may initiate execution of the application using the untrusted view. Access to trusted data and functions may be limited or prohibited by the untrusted view. When a function in a trusted page is called while using the untrusted view, an EPT violation may occur because the page containing the trusted function may be marked RO in untrusted view. Control may be transferred to the virtual machine manager, which may validate the call, change context and may selectively employ the trusted view to permit execution of the called trusted function.

When the trusted function executes a return, another EPT violation may occur because the calling page may be marked RO when in trusted view. Accordingly, control may transition once again to the virtual machine manager, which may change context and switch the current view of the virtual machine operating system back to the untrusted view. Execution of untrusted code may continue as before.

At block 508, once an application is closed or otherwise has ceased executing, the anti-malware agent may receive notification of the closure, e.g., from the kernel. The anti-malware agent may then perform memory cleanup using its callback routine.

Figure 6:
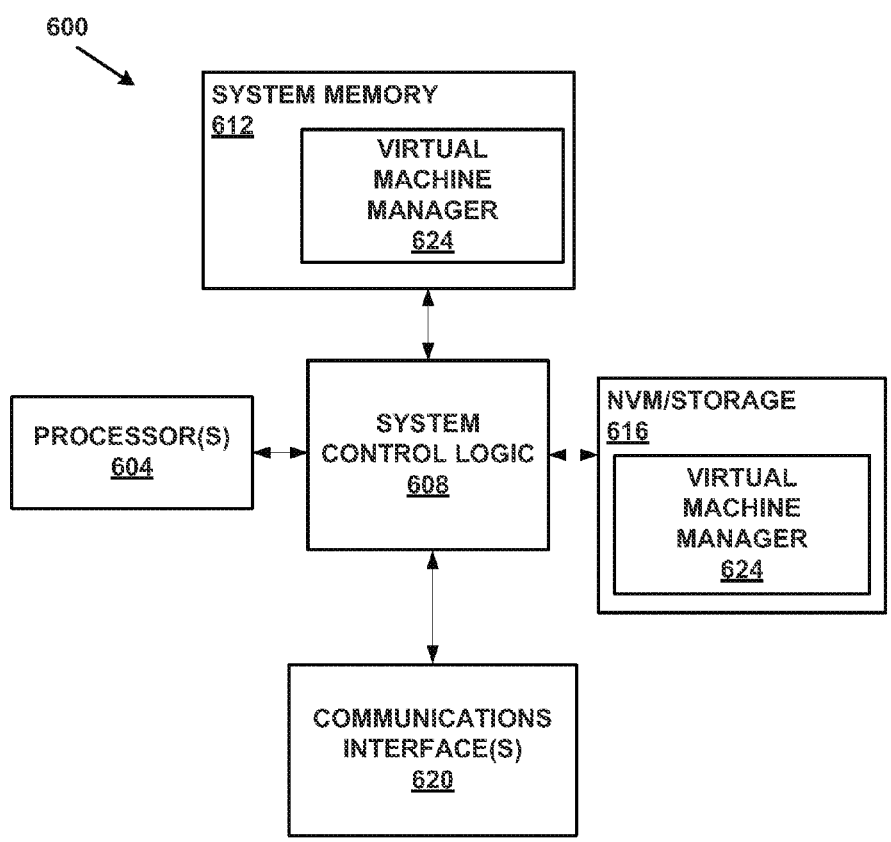
FIG. 6 schematically depicts an example system on which various disclosed methods may be implemented, in accordance with various embodiments.

The techniques and apparatuses described herein may be implemented into systems using suitable hardware and/or software to configure as desired. FIG. 6 illustrates, for various embodiments, an example system 600 comprising one or more processor(s) 604 (e.g., a processor core), system control logic 608 coupled to at least one of the processor(s) 604, non-transitory computer-readable storage medium such as system memory 612 coupled to system control logic 608, non-transitory computer-readable storage medium such as non-volatile memory ("NVM")/storage 616 coupled to system control logic 608, and one or more communications interface(s) 620 coupled to system control logic 608.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory ("DRAM"), for example.

System control logic 608 for one embodiment may include one or more input/output ("I/O") controller(s) to provide an interface to NVM/storage 616 and communications interface (s) 620.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) ("HDD (s)"), one or more solid-state drive(s), one or more compact disc ("CD") drive(s), and/or one or more digital versatile disc ("DVD") drive(s), for example.

The NVM/storage 616 may include a storage resource physically part of a device on which the system 600 is installed or it may be accessible by, but not necessarily a part of, the device. For example, the NVM/storage 616 may be accessed over a network via the communications interface(s) 620.

Communications interface(s) 620 may provide an interface for system 600 to communicate over one or more networks and/or with any other suitable device. Communications interface(s) 620 may include any suitable hardware and/or firmware.

System memory 612 and NVM/storage 616 may include temporal and persistent copies of a virtual machine manager 624, respectively. The virtual machine manager 624 may include instructions that when executed by at least one of the processor(s) 604 result in the system 600 regulating access to and protecting portions of applications residing in physical memory, as earner described. In some embodiments, the virtual machine manager 624 may additionally/alternatively be located in the system control logic 608.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package ("SiP"). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip ("SoC").

The system 600 may be a desktop or laptop computer, a mobile telephone, a smart phone, a tablet, a set-top box, a game console, or any other device adapted to compile a computer program. In various embodiments, system 600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. At least one non-transitory computer-readable storage medium having stored therein a plurality of instructions configured to provide an apparatus, in response to execution of the instructions by the apparatus, with a virtual machine manager, wherein the virtual machine manager is configured to selectively employ different views with different permissions to map guest physical memory of a virtual machine of the apparatus to host physical memory of the apparatus, to regulate access to and protect different portions of an application of the virtual machine that resides in different portions of the physical memory;

wherein a first of the different views permits write or execute access to a first portion of the application in a first portion of the physical memory, but prohibits write or execute access to a second portion of the application in a second portion of the physical memory, and the second view prohibits write or execute access to the first portion of the application, but permits write or execute access to the second portion of the application.

2. The non-transitory computer-readable storage medium of claim 1, wherein the different views are implemented using extended page tables.

3. The non-transitory computer-readable storage medium of claim 1, wherein the virtual machine manager is configured to:

determine that a portion of the application in a portion of the physical memory that is inaccessible under a current view is to be accessed; and selectively employ another view that permits access to the portion of the application based on whether instructions being executed or to be executed to access the portion of the application are malicious.

4. The non-transitory computer-readable storage medium of claim 3, wherein the virtual machine manager is further configured to compare the instructions being executed or to be executed to access the portion of the application to known malicious instructions.

5. The non-transitory computer-readable storage medium of claim 3, wherein the virtual machine manager is further configured to store in a log an indication of whether the another view was selectively employed.

6. The non-transitory computer-readable storage medium of claim 3, wherein the virtual machine manager is further configured to notify an anti-malware agent of the virtual machine when the instructions being executed or to be executed to access the portion of the application violate access permissions associated with the portion of the application.

7. At least one non-transitory computer-readable storage medium having stored therein a plurality of instructions configured to provide an apparatus, in response to execution of the instructions by the apparatus, with an anti-malware agent, wherein the anti-malware agent is configured to provide, to a virtual machine manager, different views with different permissions to map guest physical memory of a virtual machine of the apparatus to host physical memory of the apparatus, wherein the different views are selectively employed to regulate access to and protect different portions of an application of the virtual machine that resides in different portions of the physical memory.

8. The non-transitory computer-readable storage medium of claim 7, wherein the anti-malware agent is further configured to:

lock portions of the application in virtual memory; and provide, to the virtual machine manager, respective associations between the application memory in the virtual machine and the different views to be created for the application.

9. The non-transitory computer-readable storage medium of claim 7, wherein the anti-malware agent executes in accordance with a first privilege level of the apparatus, and the application of the virtual machine executes in accordance with a second privilege level of the apparatus that provides fewer privileges than the first privilege level.

10. The non-transitory computer-readable storage medium of claim 9, wherein the first and second privilege levels are hardware privilege levels of the apparatus.

11. A system, comprising:

a processor;

physical memory coupled to the processor; and a virtual machine manager to be operated by the processor to map guest physical memory of a virtual machine operated by the processor to the host physical memory;

wherein the virtual machine manager is configured to:

use one of at least a first view and a second view to map guest physical memory of the virtual machine to the host physical memory, with the first view to permit access to a first portion of an application to be executed in the virtual machine in a first portion of the physical memory, but to limit or prohibit access to a second portion of the application in a second portion of the physical memory, and the second view to limit or prohibit access to the first portion of the application, but permit access to the second portion of the application;

detect an attempt to access the second portion of the virtual machine application while the first view is in use;

determine whether to permit the access; and conditionally switch to use the second view to map guest physical memory of the virtual machine to host physical memory, based at least in part on a result of the determination.

12. The system of claim 11, wherein the virtual machine manager is further configured to determine whether computer code being executed or to be executed to access the second portion of the virtual machine application is malicious.

13. The system of claim 12, wherein to the virtual machine manager is further configured to compare computer code being executed or to be executed to access the portion of the application to known malicious or white listed computer code.

14. The system of claim 11, further comprising:
an anti-malware agent to be operated by the processor to:
lock portions of the virtual machine application in the guest physical memory;
create the first and second guest physical memory views for the virtual machine application; and
provide, to the virtual machine manager, respective associations between the virtual machine application and the first and second views.

15. The system of claim 14, wherein the anti-malware agent is executed within the virtual machine in accordance with a first privilege level of the system, and the virtual machine application is executed within the virtual machine in accordance with a second privilege level of the system that provides fewer privileges than the first privilege level.

16. The system of claim 14, wherein the first and second privilege levels are hardware privilege levels of the apparatus.

17. The system of claim 11, wherein the first and second views are implemented using extended page tables.

18. At least one non-transitory computer-readable storage medium having stored therein a plurality of instructions configured to provide an apparatus, in response to execution of the instructions by the apparatus, with a virtual machine manager, wherein the virtual machine manager is configured to:

selectively employ a plurality of different views associated with an application of the virtual machine to map guest physical memory of a virtual machine of the apparatus to host physical memory of the apparatus, to regulate access to and protect different portions of the application that resides in different portions of the physical memory;

detect an attempt to access a portion of the virtual machine application while a first of the plurality of different views, in which write or execute access to the portion of the virtual machine application is limited or prohibited, is in use;

determine whether to permit the access; and conditionally switch to use a second of the plurality of different views, in which write or execute to the portion is permitted, to map guest physical memory of the virtual machine to host physical memory, based at least in part on a result of the determination.

19. The non-transitory computer-readable storage medium of claim 18, wherein the different views are implemented using extended page tables.

* * * * *